S. B. B. Nowlan.

Water Heater for Boilers.

Nº 108,174.   Patented Oct. 11, 1870.

Witnesses.
Joh. Becker
John F. Brooks

Inventor
S. B. B. Nowlan.
pr. Munn & Co
Attys.

United States Patent Office.

SAMUEL B. B. NOWLAN, OF NEW YORK, N. Y.

Letters Patent No. 108,174, dated October 11, 1870.

IMPROVEMENT IN STEAM-GENERATORS.

The Schedule referred to in these Letters Patent and making part of the same

---

*To all whom it may concern:*

Be it known that I, SAMUEL B. B. NOWLAN, of New York, in the county of New York and State of New York, have invented a new and useful Improvement in Generating Steam; and I do hereby declare that the following is a full, clear, and exact description thereof, which will enable others skilled in the art to make and use the same, reference being had to the accompanying drawing forming part of this specification.

My invention relates to methods of generating steam and to steam-generators, and consists in certain improvements, which will first be described in connection with all that is necessary to a full understanding thereof, and then clearly specified in the claim.

Figure 1:
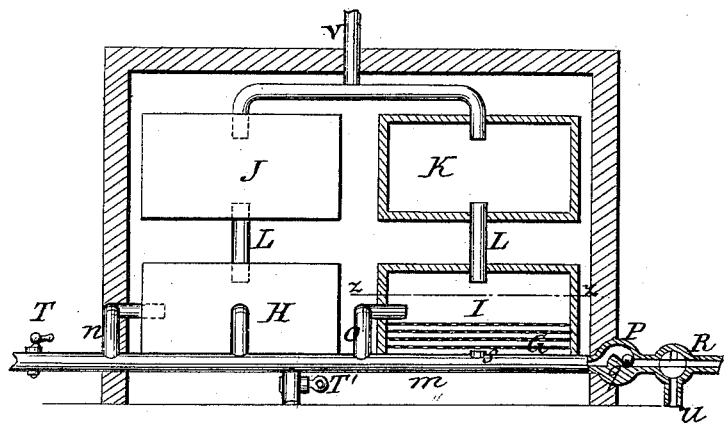
Figure 1 represents a sectional view of a hot-air chamber, with the vessels and connecting-pipes employed by me to generate and superheat the steam.
Figure 2:
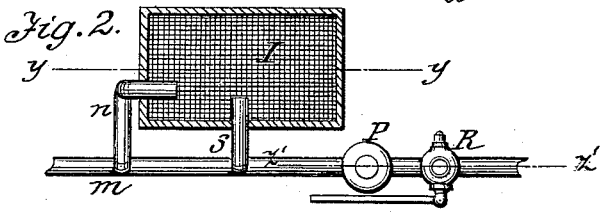
Figure 2 is a plan of a reticulated metal sieve, with supply and waste-pipes entering the same.

H and I are the steam-generators, and J K correspondingly-placed superheaters, connected therewith by pipes L. Any number of each may be employed.

I are wire screens or sieves, placed in the generating-vessels.

$m$ is a combined waste and supply-pipe, which conveys the cold water, under pressure, through the pipes $n$, and scatters it upon the sieves.

S are pipes leading from the bottom of the generators to the waste-pipe $m$, and provided with eduction-valves which close under the pressure of water, but open when it is shut off.

P is a valve-chamber in pipe $m$, having a ball or check-valve, $q$, therein. The chamber is constructed with a central ridge. That part adjacent to the inlet is large enough to admit a free movement of the ball $q$, but the channel next the exit-aperture is too much contracted transversely to allow the ball to pass into it.

$u$ is a cock having a central diametrical groove passing through it, and a radial groove at right angles thereto. When the long groove registers with the apertures of the pipe, water is admitted, but when the radial groove registers with the exit-aperture the waste water may be discharged.

T represents a supplementary pipe to carry off the water of condensation.

The mode of operation is as follows:

The cold water, being forced into the pipe $m$, raises the ball $q$, closes the valves in exit-pipes S, and is pressed up through the pipe $n$. Being scattered over the first hot metal sieve I, and trickling therethrough in small globules or comminuted particles, it is readily converted into steam. Passing to the top of vessels I, it is transferred, by means of pipes L, to the superheaters J K. From thence it passes, through the pipe V, into a steam-chest or reservoir prepared for its reception.

When the pressure of steam is greater than that of the incoming stream of water, the valve $q$ will be driven into its seat, thereby temporarily stopping the supply of water. But as soon as the steam and the pressure thereof in the generator is lessened, the valve is forced out by the current of water, and furnishes a supply to the generators.

Having thus described all that is necessary to a clear understanding of my invention,

What I esteem to be new, and desire to protect by Letters Patent, is—

1. A generator, I, having a series of sieves arranged one above another, and each covering its whole horizontal area, combined with a water-supply pipe, $n$, as and for the purpose specified.

2. The combination, with a generator, I, having gauze sieves, of a main water-pipe, $m$, auxiliary inlet-pipe, $n$, and auxiliary outlet-pipe S, all arranged and operating to feed the cold water, and take off the water of condensation, as described.

SAML. B. B. NOWLAN.

Witnesses:
 FRANK BLOCKLEY,
 ALEX. F. ROBERTS.